Aug. 4, 1931.  J. F. BELLINGER  1,817,504
EXTENSIBLE TRUNK
Filed Jan. 14, 1929  2 Sheets-Sheet 1
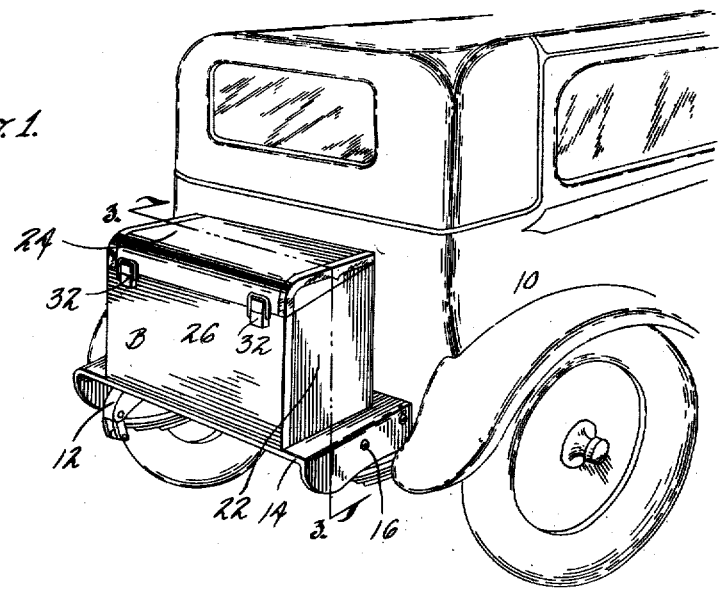
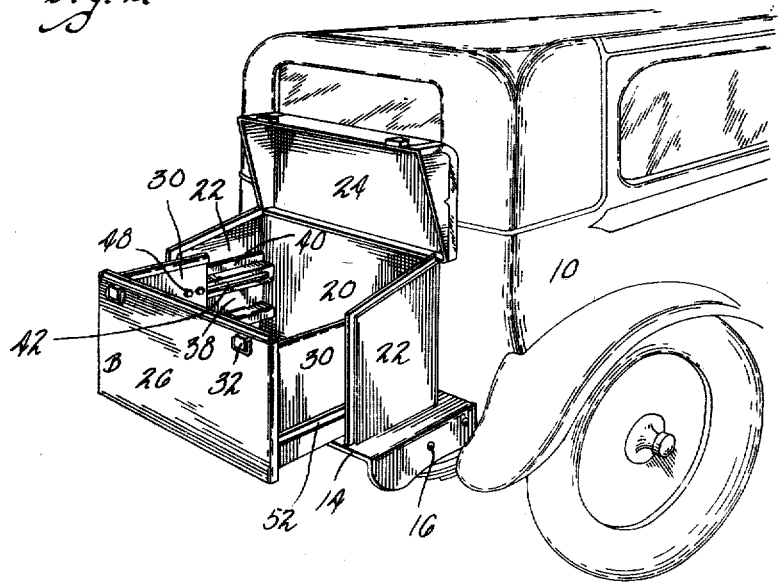

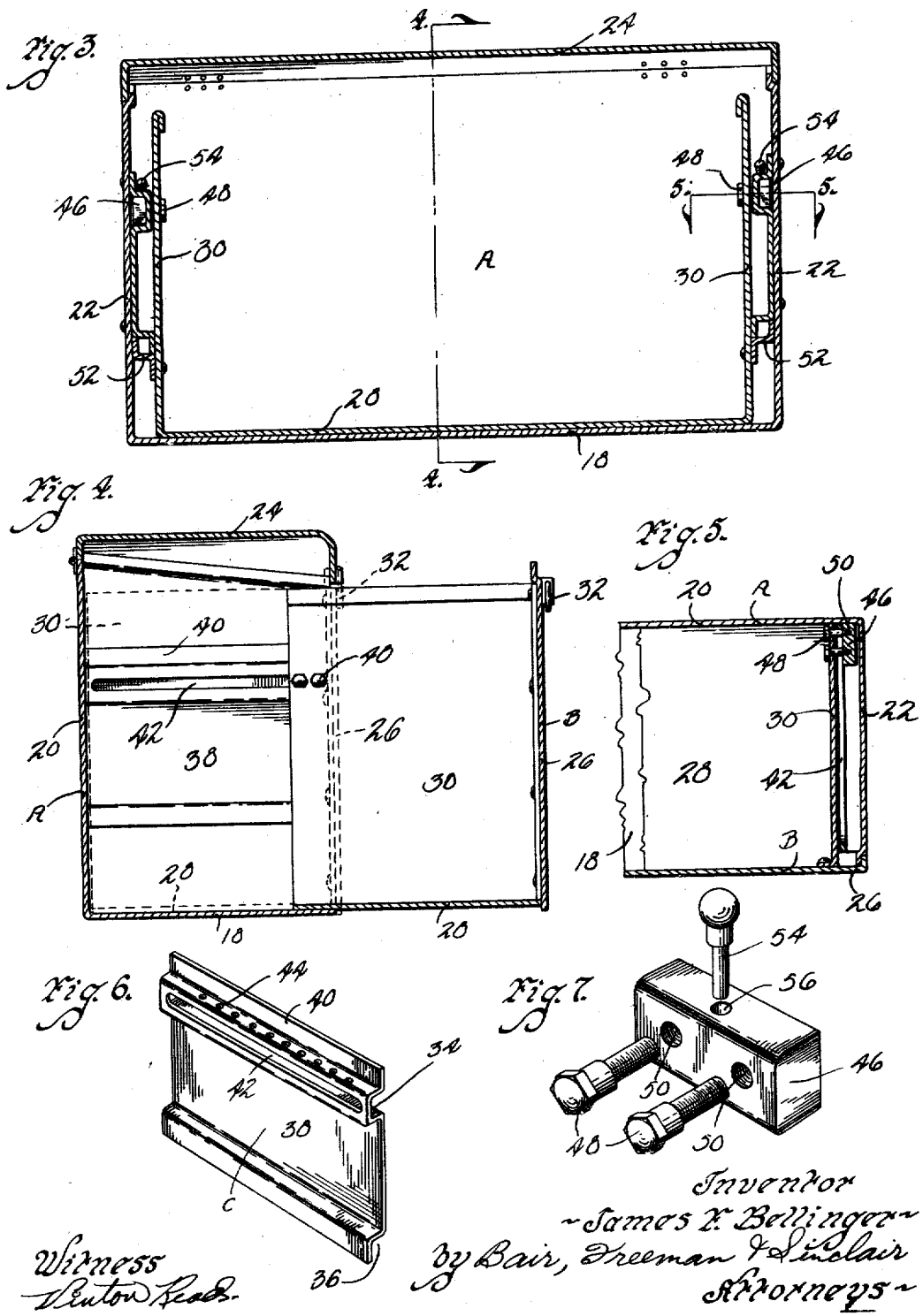

Patented Aug. 4, 1931

1,817,504

UNITED STATES PATENT OFFICE

JAMES FRANK BELLINGER, OF LA FAYETTE, INDIANA, ASSIGNOR, BY MESNE ASSIGNMENTS, TO RUSH MANUFACTURING CORPORATION, OF LA FAYETTE, INDIANA, A CORPORATION OF INDIANA

EXTENSIBLE TRUNK

Application filed January 14, 1929. Serial No. 332,263.

The object of my invention is to provide an extensible trunk of simple, durable and comparatively inexpensive construction.

More particularly it is my object to provide an extensible trunk adapted to be supported upon the rear end of an automobile and arranged so that the trunk may be conveniently and easily used as a trunk when in one position and when in an extended position, may serve as a luggage carrier for carrying large and bulky articles.

Still a further object is to provide means of connection between the extensible section of the trunk and the stationary section of the trunk whereby the parts may be easily disassembled, which means of connection also provides a way whereby the extensible section may be extended to anyone of a plurality of positions so that the size of the extensible trunk when serving as a luggage carrier may be varied as desired.

Still another object is to provide a guide plate mounted upon the inner surface of one of the end walls of the stationary section, which coacts with the guide block carried by an end wall of the movable or extensible section.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of a portion of an automobile with my improved extensible trunk mounted thereon.

Figure 2 is a similar view showing the trunk in extended position to serve as a luggage carrier.

Figure 3 is a vertical section view taken on the line 3—3 of Figure 1.

Figure 4 is a vertical sectional view taken on the line 4—4 of Figure 3, showing the trunk in extended position.

Figure 5 is a detail sectional view taken on the line 5—5 of Figure 3, illustrating the guide channel and the guide block slidably mounted therein.

Figure 6 is a perspective view of the end plate forming the guide channel structure of my trunk; and Figure 7 is a perspective view of the guide block and the bolt and pin connections associated therewith.

In the accompanying drawings I have used the reference numeral 10 to indicate generally the body of an automobile which is mounted upon the chassis or frame 12. Upon the ordinary automobile the chassis extends out beyond the rear end of the body portion and upon the extending portion of the frame or chassis I mount a trunk platform 14. The trunk platform may be of any suitable construction and is ordinarily secured to the chassis 12 by means of bolts or the like 16. The trunk platform forms no part of my present invention.

My extensible trunk includes a stationary section A and a movable section B. The stationary section A includes a bottom 18 and a rear wall 20 as well as walls 22. The front of the stationary section A is open. A hinged lid or cover 24 is connected to the rear wall 20 of the stationary section and is adapted to serve as a cover for the stationary and movable sections of the trunk when the same are in collapsed position and serve merely as a trunk.

The movable section B includes a front wall 26 adapted to cover the open front end of the stationary section A. A bottom 28 and end walls 30 are also included in the movable section B. The front wall 26 and the cover 24 carry coacting latch devices 32 whereby the cover 24 may be retained in locked position.

In order to allow for extensible movement of the movable section B, it is necessary to have a means of connection between the movable section and the stationary section.

I provide a plate C which is preferably formed of a die and is arranged to rest against the inner surface of an end wall 22 of the stationary section A. The plate C is formed with a guide channel 34 substantially near its upper edge and is provided further with an angular guide channel 36 along its lower edge.

The plate itself between the guide channel 34 and the angular guide 36 is provided with a flat body portion 38 which rests against the end wall 22 and is secured thereto by spot-welding or riveting as the case may be. Above the guide channel 34 is formed a flat portion 40 which also rests against the end wall 22 and may be secured thereto by riveting or spot-welding.

It will thus be seen that when the plate C is in position against the inner surface of an end wall 22, that there is formed a receiving channel 34 and an angular guide 36. In the material forming the guide channel 34 there is provided an elongated slot 42 and a plurality of spaced openings 44. The purpose of the openings 44 will be hereinafter more fully set forth.

Mounted between the sides of the guide channel 34, is a guide block 46. The guide block 46 is slidably mounted within the guide channel 34 and is secured to an end wall 30 of the extensible or movable section B of the trunk. A pair of machine screws 48 extend through the end wall 30 through the slot 42 and into screw threaded openings 50 formed in the guide block 46. The screws 48 serve to connect the movable section B with the guide block 46 and in turn connect the movable section to the stationary section A.

A guide flange 52 is connected to the outer surface of the end wall 30 of the movable section B which guide flange coacts with the guide channel 36 as clearly illustrated in Figure 3 of the drawings. It will thus be noted that the movable section is telescopically connected by means of the guide block 46 and the guide flange 52 to the stationary section A.

The amount of movement of the extensible section relative to the fixed section is limited by the length of the slot 42. When it is desired to disassemble the movable section from the stationary section, it is only necessary to remove the two screws 48 and thereafter the extensible section B may be moved entirely from the stationary section A.

In order to adjust and thereafter lock the movable section in various extended positions, I provide a pin 54 which may extend through any of the openings 44 in the plate C and also into an opening 56 formed in the guide block 46.

It will thus be seen that when the pin 54 extends through one of the openings 44 and into the opening 56 of the guide plug 46, that any further adjustment or movement of the extensible section is prohibited until after the pin 54 has been removed.

It will be noted that the plate C together with the guide flange 52 and the guide block 46 serve as the entire means of connection between the movable section B and the stationary section A. The parts are simple, and may be conveniently assembled or disassembled which adds materially to economy in cost of manufacture.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. An extensible trunk structure comprising a stationary section, a movable section and means for slidably mounting one relative to the other, such means comprising a plate, a guide channel formed therein adjacent the top edge thereof and being associated with the upper edge of said stationary section, said plate having an angular guide formed on its lower edge and said movable section having a guide flange cooperating therewith, a guide block longitudinally slidable in said guide channel, a slot in the web of said guide channel and means of connection between said guide block and the movable section, said means of connection extending through said slot.

2. A means for connecting the stationary and the movable sections of an extensible trunk together comprising a plate having a guide channel and an angular guide formed thereon, a guide block slidable relative to and completely housed in said guide channel, a guide flange slidably associated with said angular guide and means for connecting the plate with one section of the trunk and the guide block and guide flange with the other section thereof.

3. A means for connecting the stationary and the movable sections of an extensible trunk together comprising a plate having a guide channel and an angular guide formed thereon, a guide block slidable in said guide channel, a guide flange slidably associated with said angular guide and means for connecting the plate with one section of the trunk and the guide block and guide flange with the other section thereof, said guide channel having a slot through which the means for connecting the guide block to its respective section of the trunk extends.

Des Moines, Iowa, December 28, 1928.

JAMES FRANK BELLINGER.